United States Patent [19]
Harrison et al.

[11] Patent Number: 5,825,720
[45] Date of Patent: Oct. 20, 1998

[54] COMBINATION SEAL AND WEAR FOR AN AIR GUN

[75] Inventors: Earnest R. Harrison, Houston; David M. McCall, Richmond, both of Tex.

[73] Assignee: Input/Output, Inc., Strafford, Tex.

[21] Appl. No.: 955,827

[22] Filed: Oct. 22, 1997

[51] Int. Cl.$^6$ .................................................. H04R 23/00
[52] U.S. Cl. ........................................ 367/144; 181/120
[58] Field of Search .............................. 367/144; 29/235, 29/450; 181/115, 120

[56] References Cited

U.S. PATENT DOCUMENTS

| | | | |
|---|---|---|---|
| 5,228,010 | 7/1993 | Harrison | 367/144 |
| 5,365,493 | 11/1994 | Harrison | 367/144 |
| 5,646,909 | 7/1997 | Bouyoucos | 367/144 |
| 5,646,910 | 7/1997 | Bouyoucos | 367/144 |

*Primary Examiner*—Ian J. Lobo
*Attorney, Agent, or Firm*—Tim Headley; Haynes and Boone, L.L.P.

[57] ABSTRACT

A wear ring assembly for an air gun includes a support ring having a receiving recess of a first length formed in a surface of an end of the support ring. An elastic ring is adjacent an end of the receiving recess. A wear ring seats in the receiving recess and is of a second length, greater than the first length, such that a portion of the wear ring overlaps the end of the support ring, thereby covering and deforming the elastic ring. The wear ring is formed of a thin, low-friction, wear-resistant plastic material having dimensions such that the wear ring does not plastically yield during installation into the receiving recess. Installation is accomplished by attaching a core tool adjacent the seal groove. The wear ring is installed with an expanding pusher tool, over the core tool and into the receiving recess.

23 Claims, 3 Drawing Sheets

COMBINATION SEAL AND WEAR FOR AN AIR GUN

BACKGROUND

This invention relates generally to seismic air guns which generate a seismic shock wave for seismic exploration, and more particularly, to a wear ring assembly which seals a seismic air gun against leakage.

U.S. Pat. No. 5,001,679 to Harrison, the contents of which are incorporated by reference, discloses an air gun.

Air guns utilize seals and wear rings to reduce leakage, friction, and wear. Some known seals made from polytetrafluoroethylene material can be expanded to seat into an existing seal groove, but the seals yield from the expansion, take a set, and do not readily return to their original diameter. Heat and compression forces are required in order to reform the seal such that the seal properly fits within the seal groove, thus completing the installation. The process of applying heat and compression to the seals is time consuming. Another type of seal is a split seal, known in the trade as a "chevron seal." The "chevron seal" may be fitted into an existing seal groove, but because it is a split seal, some air leakage occurs along the split portion of the seal.

Therefore, what is needed is an apparatus and a method providing a wear ring assembly which installs quickly and easily, effectively seals, and reduces friction.

SUMMARY

A wear ring assembly for an air gun includes a support ring having a receiving recess of a first length formed in a surface of an end of the support ring. An elastic ring is adjacent an end of the receiving recess. A wear ring seats in the receiving recess and is of a second length, greater than the first length, such that a portion of the wear ring overlaps the end of the support ring, thereby covering and deforming the elastic ring.

A principal advantage of this embodiment is that the wear ring assembly is able to elastically conform to a sealing groove in the air gun, thus eliminating the need to apply heat or compression in order to properly mount the wear ring assembly in the sealing groove. The wear ring is provided to wear and conform into mating, slidable engagement with a moving part. The wear ring is capable of being quickly replaced by a special tool.

DETAILED DESCRIPTION OF THE PREFERRED EMBODIMENT

Figure 1:
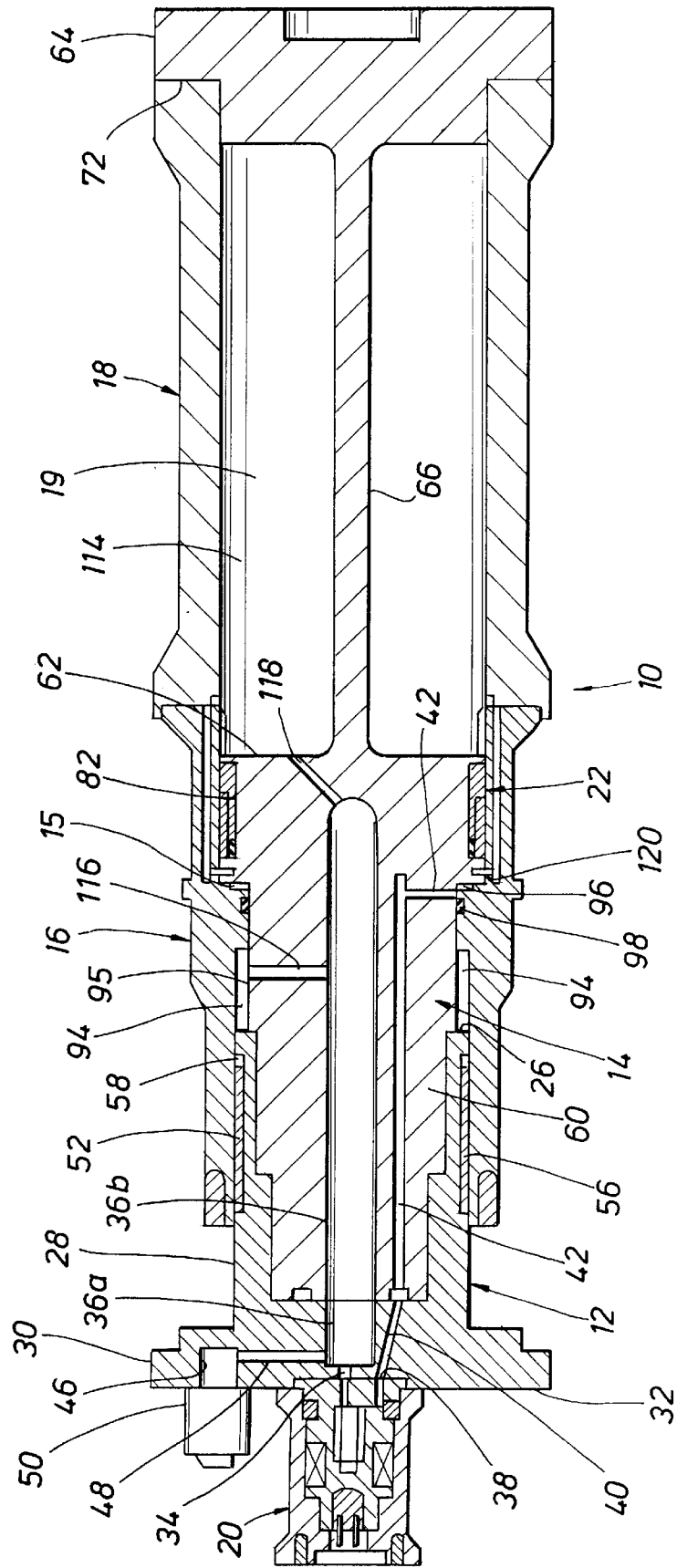
FIG. 1 is a cross-sectional side view illustrating an embodiment of a seismic air gun including an embodiment of the wear ring assembly of the present invention.

Referring now to FIG. 1, a seismic air gun 10 includes a cap 12, a body 14, and a shuttle 16. The body 14 and the shuttle 16 define a firing chamber 15. The cap 12, the body 14, and the shuttle 16 define a control chamber 94. The gun 10 also includes a chamber sleeve 18. The body 14, the shuttle 16, and the chamber sleeve 18 define a primary chamber 19. The air gun 10 further includes a solenoid 20, and a wear ring assembly 22. The cap 12 is a cylindrical hollow sleeve having an end face 26, an exterior surface 28, and a flange 30 which defines a face 32. The solenoid 20 mounts against the face 32, and includes an inlet 34 and an outlet 38. The inlet 34 connects to an orifice 36a in the cap 12, and the outlet 38 connects to an orifice 40 in the cap 12, which communicates with a passage 42 in the body 14. An orifice 36b of the body 14 connects to the orifice 36a. The cap 12 further includes an orifice 48 having an opening 46. The orifice 48 permits fluid communication from the opening 46 to the orifice 36a. A fitting 50 is attached to the opening 46. A recess 52 in the surface 28 receives a wear ring 56 and a seal 58 which seals against leakage of fluid between the shuttle 16 and the cap 12.

The body 14 has a multi-stepped cylindrical portion 60, a shoulder 62, and a cylindrical end portion 64 connected to the multi-stepped cylindrical portion 60 by a center post 66. The end portion 64 includes a shoulder 72 engaged with a chamber sleeve 18. The multi-stepped cylindrical portion 60 includes an annular seal groove 82 into which the wear ring assembly 22 is disposed. The cap 12 sealingly mounts over the multi-stepped cylindrical portion 60 using fasteners (not shown).

Figure 1A:
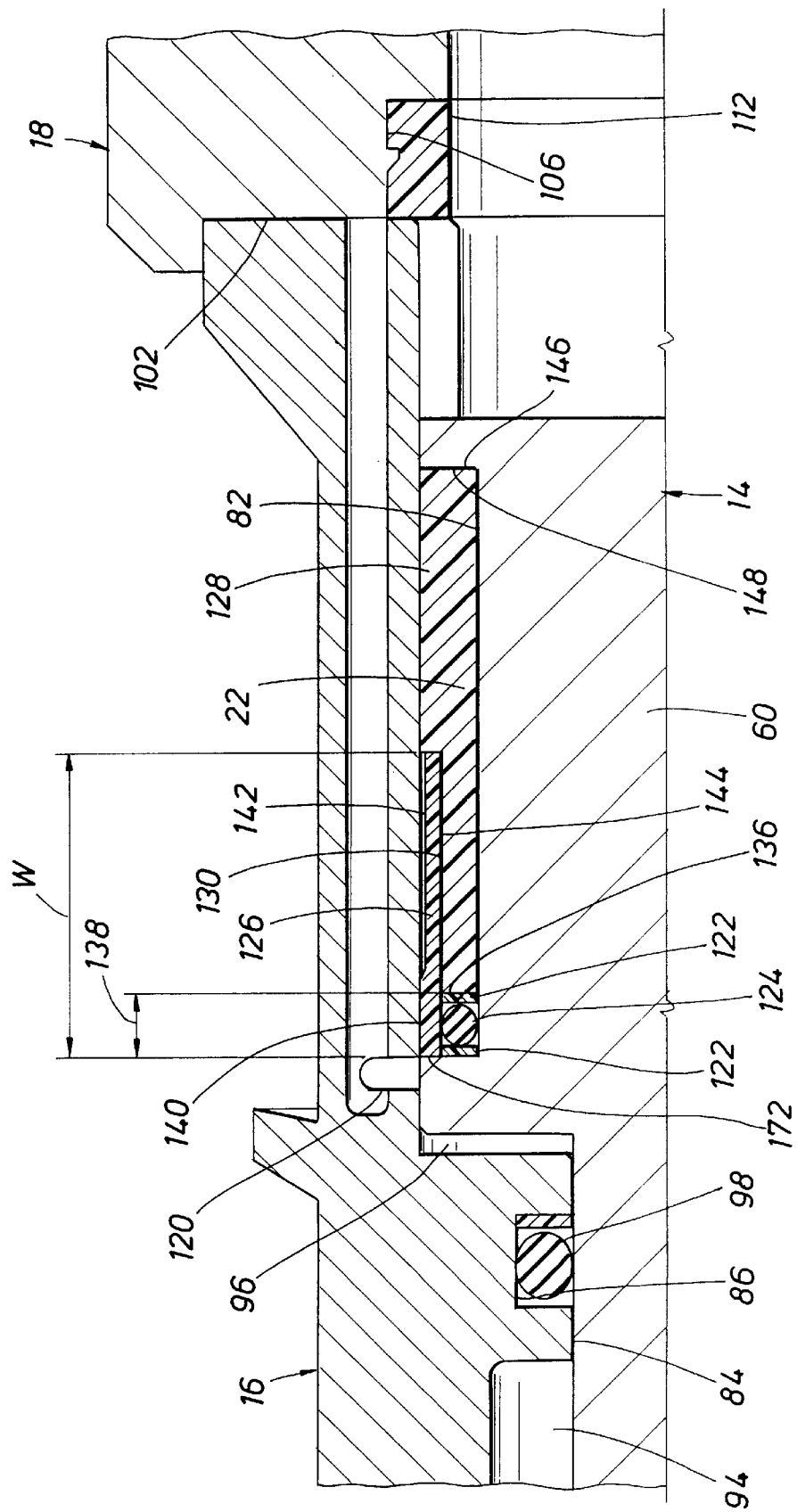
FIG. 1A is an enlarged view of the wear ring assembly of FIG. 1.

Referring now to FIG. 1A, the shuttle 16 surrounds the multi-stepped cylindrical portion 60, and includes an interior cylindrical surface 84 having an annular recess 86. A seal 98 is received within the annular recess 86 in the internal surface 84 of the shuttle 16. The wear ring assembly 22 and the seal 98 limit fluid leakage in the firing chamber 96. The chamber sleeve 18 abuts shuttle 16 at a face 102, and includes a recess 106. A seal 112 is disposed within the recess 106.

Referring now to FIG. 1, the orifice 36b connects to the control chamber 94 and the primary chamber 19 through a passage 118. The passage 42 connects to the firing chamber 15. An electrical circuit (not shown) connects to the solenoid 20 to transmit a firing signal which activates the solenoid. When the solenoid 20 activates, compressed air from the fitting 50 travels into the solenoid through the inlet 34, out through the outlet 38, into the passage 42, and then to the firing chamber 15. A vent 120 in the shuttle 16 provides venting for the firing chamber 15.

Referring now to FIG. 1a, the wear ring assembly 22 seals the body 14 with the shuttle 16 in a close-fitting, mating, slidable relationship. The wear ring assembly 22 includes a pair of split backup rings 122, an elastic ring or 0-ring 124, a wear ring 126, and a split support ring 128 having a receiving recess 130. The support ring 128 mounts inside the seal groove 82. The support ring 128 is made from a long wearing, low friction materal like an acetal material such as a homopolymer, available from the DuPont Company of Wilmington, Del., or a copolymer, available from the Hoechst Celanese Corporation of Somerville, N.J. The split backup rings 122 mount in the seal groove 82, adjacent the support ring 128. The elastic ring 124 mounts in the seal groove 82 between the split backup rings 122. The wear ring 126 seats in the receiving recess 130. The wear ring 126 has a thickness and diameters which correspond to that of the receiving recess 130. The wear ring 126 has a width which is greater than a corresponding width of the receiving recess 130 such that the wear ring 126, when fit into the receiving recess 130, overlaps a surface or edge 136 of the support ring 128, thus defining an overlap portion 138 of the wear ring 126. The overlap portion 138 covers the elastic ring 124 and the split backup rings 122, and deforms the elastic ring 124 in compression.

The wear ring 126 is made of a thin, low-friction, wear-resistant plastic material having dimensions such that the stresses induced at installation into the receiving recess 130 will not plastically yield the wear ring 126. Suitable materials include a polyamide-imide or a polyetheretherketone, both available from Amoco Polymers Inc. of Atlanta, Ga. The maximum diameter, De, to which the wear ring 126 can elastically expand, without plastically yielding, can be calculated using the relationship:

$$De = (D1/E)(Sy+E),$$

where:

D1=the outside diameter of the wear ring,

E=modulus of elasticity (psi) of the wear ring, and

Sy=yield strength of the wear ring.

The thickness, T, of the wear ring 126 can be calculated using the following relationship:

$$T = (De - D1)/2$$

The wear ring 126 includes a crown 140, on a sealing surface 142, opposite a surface 144 against which the elastic ring 124 abuts. The crown 140 is a region of the surface 142 which has a length which corresponds to the length of the overlap portion 138 and a slightly larger diameter than the remainder of the surface 142. The crown 140 provides an initial sealing surface which quickly conforms or wears into close mating, slidable engagement with shuttle 16.

Referring now to FIG. 1, in operation, a method of installing the wear ring assembly 22 involves several steps. In step one, the support ring 128, the split backup rings 122, and the elastic ring 124 are installed into the seal groove 82. Because the support ring 128 is split, installation is facilitated. The support ring 128 is installed first, then the two split backup rings 122 are installed in a gap which corresponds in width to the overlap portion 138, defined above. The gap is fully open when the face 146 of the support ring 128 abuts a face 148 of the seal groove 82. With the split backup rings 122 already installed, the elastic ring 124 is installed between them. Because the elastic ring 124 is highly elastic, it installs in the gap without difficulty.

Figure 2:
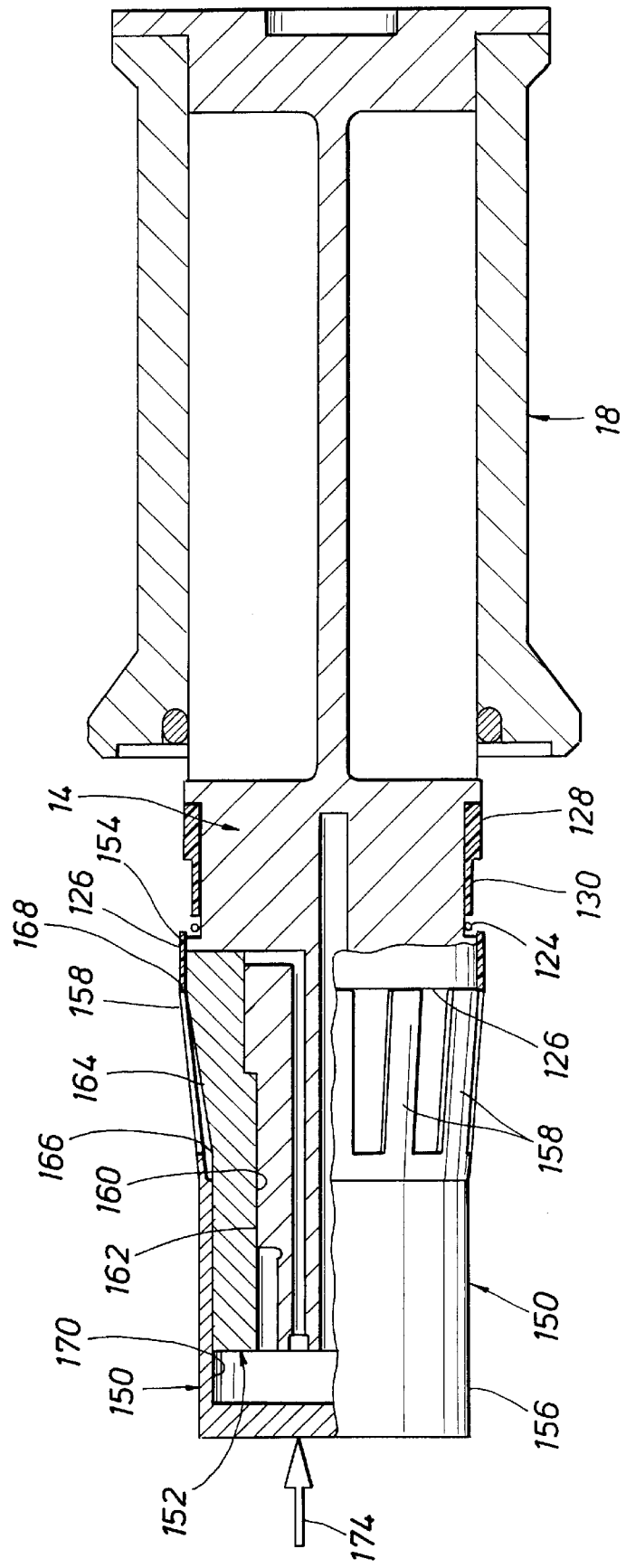
FIG. 2 is an enlarged partial view of an embodiment of a seismic air gun including an embodiment of an installation tool used to install the wear ring assembly of FIGS. 1 and 2.

Referring now to FIG. 2, in step two, a pusher 150 and a mating tapered cone tool 152 are used to gently and uniformly expand the wear ring 126 such that the wear ring elasticity deforms sufficiently to slide over a cylindrical surface 154 of the body 14 without significant plastic deformation. The pusher 150 has a hollow, cylindrical body 156 from which fingers or tines 158 extend and which push the wear ring 126 into the receiving recess 130 of support ring 128. The tines 158 are evenly spaced about the circumference of the cylindrical body 156. The cone tool 152 has an inner cylindrical surface 160 having a shape which slidably engages an outer cylindrical surface 162 of the body 14. The cone tool 152 further has a conical surface 164 having a diameter on one end 166 which is slightly less than the undeformed inner diameter of the wear ring 126, and a diameter on an opposite end 168 which is slightly greater than the diameter of the surface 154.

The pusher 150 has an inner cylindrical surface 170 having a shape which slidably engages surface 164 of the cone tool 152. In an undeformed state, the tines 158 contact a face 172 (shown in FIG. 1A) of the wear ring 126. An installing force, indicated by the directional arrow designated 174, is applied to the pusher 150 which transmits to the face 172 of the wear ring 126. The wear ring 126 then begins to ride up the conical surface 164. Because the diameter of the conical surface 164 steadily increases as the wear ring 126 moves along surface 164, the wear ring expands. When the wear ring 126 reaches the opposite end 168 of the conical surface 164, the wear ring has expanded sufficiently to pass over the surface 154. The pusher 150 continues to apply the force 174 to the wear ring 126, which causes the wear ring to slide into the receiving recess 130. Provided that the effective amount of taper in the conical surface 164 does not exceed T, as calculated above, the wear ring 126 will elastically return to its original shape, thus snugly fitting within the receiving recess 130, and apply a compressing force to the elastic ring 124. This completes the installation of the wear ring assembly 22.

Referring again to FIG. 1A, a method of refurbishing the wear ring assembly 22 includes several steps. Step one requires disassembly of the air gun 10. Step two requires determining which components 122, 124, 126, and/or 128 require replacement. Step three requires removal of any such components. Step four requires installing replacements for the components. Referring again to FIG. 2, in step five, as in step four of the method of installing the wear ring assembly 22, the pusher 150 and the mating tapered cone tool 152 gently and uniformly expand and slide the wear ring 126 such that the wear ring elastically deforms, without significant yielding, and slides into the receiving recess 130.

In another embodiment, the elastic ring 124 is a metal garter spring (a coil spring in which its ends connect together in a ring). The coils of the garter spring are deformed on a side which is perpendicular to the axis of the garter spring, in such a manner that the coils themselves remain circular in shape and parallel to one another. However, after deformation, a perpendicular axis of an individual coil of the garter spring (the axis being roughly positioned as if the coil were circular, the spiral shape being ignored) is no longer collinear with a line connecting adjacent center points of adjacent coils (as it was prior to deformation). Because of the garter spring's metal construction, the garter spring does not require backing up with the split backup ring 122. In an alternate embodiment, the garter spring is enclosed in an elastomeric sheath, or is molded inside an elastomeric ring.

The principal advantage of these embodiments is that the wear ring assembly 22 elastically expands into the seal groove 82 without yielding, thus eliminating the need to apply heat or compression to the wear ring 126. Another advantage is that the crown 140 functions as a sacrificial wear surface. Because contact stresses between the shuttle 16 and the crown 140 are initially very high, the crown quickly conforms or wears into almost perfect mating, slidable engagement with the shuttle. Another advantage is that a worn out ring may quickly and easily be replaced by using the pusher 150 and the mating cone tool 152.

Although illustrative embodiments have been shown and described, a wide range of modifications, changes, and substitutions is contemplated in the foregoing disclosure, and in some instances, some features of the embodiments may be employed without a corresponding use of other features. Accordingly, it is appropriate that the appended claims be construed broadly and in a manner consistent with the scope of the embodiments disclosed.

What is claimed is:

1. A wear ring assembly for an air gun, the wear ring assembly comprising:

a support ring having a receiving recess of a first length formed in a surface of an end of the support ring;

an elastic ring adjacent an end of the receiving recess; and a wear ring in the receiving recess, the wear ring being of a second length greater than the first length, such that a portion of the wear ring overlaps the end of the support ring, and covers and deforms the elastic ring.

2. The wear ring assembly as defined in claim 1 wherein backup rings are positioned on two sides of the elastic ring.

3. The wear ring assembly as defined in claim 1 wherein the backup rings are split.

4. The wear ring assembly as defined in claim 1 wherein the wear ring includes a raised crown on a sealing surface of the wear ring.

5. The wear ring assembly as defined in claim 1 wherein the wear ring is formed of a low-friction, wear resistant plastic material.

6. The wear ring assembly as defined in claim 1 wherein the wear ring is formed of a polyamide-imide material.

7. The wear ring assembly as defined in claim 1 wherein the support ring is formed of an acetal material.

8. The wear ring assembly as defined in claim 1 wherein the wear ring is formed of a polyetheretherketone material.

9. The wear ring assembly as defined in claim 1 wherein the thickness, T, of the wear ring is determined using the relationships $D_e=(D1/E)(Sy+E)$, wherein $T=(D_e-D1)/2$, $D_e$ is the maximum diameter to which the wear ring can elastically expand without substantial plastic yielding, D1 is an outside diameter of the wear ring, Sy is a yield strength of the wear ring, and E is the modulus of elasticity of the wear ring.

10. The wear ring assembly as defined in claim 1 wherein the wear ring is formed of a plastic material having dimensions such that the wear ring is deformed and avoids plastically yielding during installation into the receiving recess.

11. A seismic air gun device comprising:
 a main body member having a seal groove formed in the main body member;
 a shuttle member mounted in sealing engagement with the main body member, a portion of the shuttle member being adjacent the seal groove;
 a support ring seated in the seal groove, the support ring having a receiving recess formed in the support ring adjacent the shuttle member;
 an elastic ring seated in the seal groove adjacent the support ring; and
 a wear ring seated in the receiving recess, the wear ring including an end portion overlapping and compressing the elastic ring.

12. The seismic air gun as defined in claim 11 wherein the elastic ring is seated between a pair of split backup rings, the wear ring overlapping the backup rings.

13. The seismic air gun as defined in claim 11 wherein the wear ring includes a raised crown on a surface of the wear ring.

14. The seismic air gun as defined in claim 11 wherein the raised crown is formed on the end portion of the wear ring overlapping the elastic ring.

15. The seismic air gun as defined in claim 11 wherein the wear ring is formed of a plastic material having dimensions such that the wear ring is deformed and avoids plastically yielding during installation into the receiving recess.

16. The seismic air gun as defined in claim 15 wherein the wear ring is formed of a low-friction, wear resistant plastic material.

17. The seismic air gun as defined in claim 15 wherein the wear ring is formed of a polyamide-imide material.

18. The seismic air gun as defined in claim 15 wherein the wear ring is formed of an acetal material.

19. The seismic air gun as defined in claim 15 wherein the wear ring is formed of a polyetheretherketone material.

20. A reciprocating apparatus comprising:
 a main body member having a seal groove formed in the main body member;
 a reciprocating shuttle member mounted in sealing engagement with the main body member;
 a support ring seated in the seal groove, the support ring having a receiving recess formed in the support ring adjacent the shuttle member;
 a sealing ring seated in the seal groove adjacent the support ring; and
 a wear ring seated in the receiving recess, the wear ring being in sealing engagement with the shuttle member and including an end portion overlapping and compressing the sealing ring in the seal groove.

21. The reciprocating apparatus as defined in claim 20 wherein the wear ring includes a raised crown on a surface of the wear ring in engagement with the shuttle member, the raised crown being formed on the end portion overlapping and compressing the sealing ring in the seal groove.

22. The reciprocating apparatus as defined in claim 21 wherein the sealing ring is seated between a pair of split backup rings, the wear ring overlapping the backup rings.

23. In an air gun having a main body and a shuttle member mounted for reciprocating movement about the main body, a method of creating a fluid seal between the shuttle and the main body comprising the steps of:
 a. providing an annular seal groove in the main body of the air gun adjacent to the shuttle member;
 b. providing a wear ring having a raised crown portion;
 c. providing a support ring having formed in it a receiving recess;
 d. seating the support ring in the seal grove; and
 e. using an expanding pusher tool, installing the wear ring in the support ring's receiving recess such that one end of the wear ring overlaps and compresses the sealing member, and the raised crown portion of the wear ring is positioned for engaging the shuttle member.

* * * * *

UNITED STATES PATENT AND TRADEMARK OFFICE
CERTIFICATE OF CORRECTION

PATENT NO. : 5,825,720

DATED : October 20, 1998

INVENTOR(S) : Earnest R. Harrison

It is certified that error appears in the above-identified patent and that said Letters Patent is hereby corrected as shown below:

On the title page, item [54] and Column 1, line 1,

"COMBINATION SEAL AND WEAR FOR AN AIR GUN" should be --COMBINATION SEAL AND WEAR RING FOR AN AIR GUN--

Col. 3, line 35 "the face 146" should be --a face 146--

Signed and Sealed this

Twenty-sixth Day of January, 1999

Attest:

Attesting Officer

*Acting Commissioner of Patents and Trademarks*